US012664707B2

(12) United States Patent
de Lande Long

(10) Patent No.: US 12,664,707 B2
(45) Date of Patent: Jun. 23, 2026

(54) SYSTEM AND METHOD FOR PERSONALIZED SPACE PLANNING

(71) Applicant: Peter de Lande Long, Westport, CT (US)

(72) Inventor: Peter de Lande Long, Westport, CT (US)

( * ) Notice: Subject to any disclaimer, the term of this patent is extended or adjusted under 35 U.S.C. 154(b) by 0 days.

(21) Appl. No.: 18/952,656

(22) Filed: Nov. 19, 2024

(65) Prior Publication Data

US 2025/0200850 A1     Jun. 19, 2025

Related U.S. Application Data

(63) Continuation-in-part of application No. 18/542,653, filed on Dec. 16, 2023, now abandoned.

(51) Int. Cl.
| | |
|---|---|
| *G06T 11/60* | (2026.01) |
| *G06F 3/0486* | (2013.01) |
| *G06F 3/0488* | (2022.01) |
| *G06Q 30/0601* | (2023.01) |

(52) U.S. Cl.
CPC ............ *G06T 11/60* (2013.01); *G06F 3/0486* (2013.01); *G06Q 30/0631* (2013.01); *G06Q 30/0643* (2013.01); *G06F 3/0488* (2013.01); *G06T 2200/24* (2013.01); *G06T 2210/04* (2013.01)

(58) Field of Classification Search
CPC . G06T 11/60; G06T 2200/24; G06T 2210/04; G06F 3/0486; G06F 3/0488; G06Q 30/0631; G06Q 30/0643
See application file for complete search history.

(56) References Cited

U.S. PATENT DOCUMENTS

| | | | | |
|---|---|---|---|---|
| 10,025,473 B2* | 7/2018 | Sarao | .................. | G06F 3/04842 |
| 10,643,344 B1* | 5/2020 | Chuah | .................. | H04N 23/698 |
| 10,895,952 B2* | 1/2021 | Hong | ..................... | G06T 17/10 |
| 11,625,508 B2* | 4/2023 | Kim | ......................... | G06N 3/08 |
| | | | | 706/19 |
| 2013/0222393 A1* | 8/2013 | Merrell | .................. | G06T 11/00 |
| | | | | 345/441 |
| 2013/0259308 A1* | 10/2013 | Klusza | .................... | G06T 19/00 |
| | | | | 382/103 |
| 2014/0012545 A1* | 1/2014 | Tsongas | ............. | G01C 21/3841 |
| | | | | 703/1 |
| 2018/0217621 A1* | 8/2018 | Biesterveld | ........ | G05D 23/1917 |
| 2019/0005159 A1* | 1/2019 | Raman | ................ | G06F 16/2428 |

(Continued)

*Primary Examiner* — Bryan Earles

(57) ABSTRACT

The present invention is directed to a system and method for displaying interior design proposals for a given room according to known design principles and user preferences. The system is operative to convert user-input sketches and/or blueprints of two-dimensional space geometry into digital floor plans and identify and propose blocks of appliances and/or articles of furniture as design elements defined by their dimensions and any limiting characteristics. Each block is functionally and dimensionally appropriate for the floor plan based on user preferences, as filters, and floor plan limitations and may be defined by minimum space requirements, anchor point restrictions, and configuration restrictions. The system and method may further comprise visual tools for conveying a user's creative taste, style, and aesthetic for each floor plan, and be operative to display hyperlinked shopping lists in accordance with filtered blocks of design elements.

19 Claims, 12 Drawing Sheets

(56)  References Cited

U.S. PATENT DOCUMENTS

| 2020/0357132 A1* | 11/2020 | Jovanovic | G06T 7/80 |
| 2023/0153478 A1* | 5/2023 | Hudson | G06F 3/04845 |
| | | | 703/1 |

* cited by examiner

GENERATE A FLOOR PLAN

522

RECEIVE ONE OR MORE FILTERS

524

REDUCE DATABASE OF ALL POSSIBLE BLOCKS IN
ACCORDANCE WITH ONE OR MORE FILTERS

526

DISPLAY ONE OR MORE FLOOR PLANS POPULATED
WITH AVAILABLE BLOCKS

528

700

702

SYSTEM AND METHOD FOR PERSONALIZED SPACE PLANNING

CROSS-REFERENCE TO RELATED APPLICATIONS

This application is a continuation-in-part of U.S. patent application Ser. No. 18/542,653, filed on Dec. 16, 2023, which is incorporated herein by reference.

GOVERNMENT CONTRACT

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to interior design and, more particularly, to systems and methods for digitally visualizing interior designs.

BACKGROUND

Interior design can be complex and inaccessible for the average person. Many find it challenging to visualize and execute design concepts without formal training or access to specialized tools, whether it's in choosing the right color palette, optimizing space usage, or selecting furniture that fits their lifestyle. Traditional design processes can be time-consuming, intimidating, and often require substantial financial investment, and those tools that are accessible to consumers and design amateurs are often limited in their functionality. As a result, some have proposed leveraging artificial intelligence ("AI") to aid the interior design process.

For example, US20210173968 discloses systems and methods for visualizing furnishing objects in a property. An exemplary system in this disclosure includes a communication interface configured to receive a depth image of an interior space of the property captured by a 3D scanner, and the depth image includes one or more existing furnishing objects in the interior space. The system further includes at least one processor configured to remove at least one existing furnishing object from the depth image, leaving at least one hole in the depth image corresponding to where the removed existing furnishing object used to be. The at least one processor is further configured to restore the depth image by filling the at least one hole in the depth image with a scene of the interior space that was blocked by the removed existing furnishing object, using a first neural network model trained with an image inpainting algorithm.

The at least one processor is also configured to insert at least one new furnishing object in the restored image and render a 3D view of the interior space with the at least one new furnishing object for display.

U.S. Ser. No. 11/367,250 discloses a method for virtual interaction with a three-dimensional indoor room including: generating a virtual room model, generating a virtual room visual representation, providing the room data to a display device, receiving a virtual object selection, rendering an updated virtual room visual representation based on the virtual object, and providing the updated virtual room visual representation to the display device. The method can optionally include updating the virtual room. A system for virtual interaction with a three-dimensional indoor room includes: a backend platform and a front-end application.

Still, these and other AI interior design method proposals suffer from limitations including complexity and ease of use, particularly for homeowners and non-professional users. Thus, there remains a need for a user-friendly, AI-driven platform that simplifies the design process; makes professional-grade interior design accessible, efficient, and affordable for a broader audience; bridges the gap between amateur interior design enthusiast and professional design expert; and enables users to bring their unique vision to life with ease.

SUMMARY

The present disclosure is directed to a system and method configured to digitally populate and display, or present, exemplary interior spaces as floor plans defined by user-input sketches with movable blocks of interior design elements according to interior design principles and user preferences as layout and configuration requirements, preferences, and restrictions.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment, the system for personalized space planning comprises a dynamic database of interior design guidelines and blocks of design elements, enabling the continuous addition and integration of new layout configurations, design principles, and an array of product options. It is configured for ongoing refinement, which ensures that the system and method for personalized space planning remains in sync with the latest user needs and trends in the ever-changing landscape of interior design.

The system comprises one or more user computer devices or computer terminals configured to display interior design options for a given room (floor plan) according to known design principles and user preferences. Namely, the system to convert user-input sketches and/or blueprints of two-dimensional space geometry into digital floor plans and populate each floor plan with a variety of design proposals. As such, a method for personalized space planning is a computer implemented method In some embodiments, each user computing device has a touchscreen display on a smartphone or tablet computer, configured to receive a selection of a room type at a computer terminal as well as floor plan defining the selected room type. This can be achieved by generating or presenting a display screen with a window as an interactive user interface operative to both receive a sketch of a room shape as a room shape input and record a sketch of the room shape input. Still, providing a user computing device without a touchscreen display will not deviate from the invention. In some embodiments, for example, the user computing device may be configured to receive a digital blueprint of the floor plan defining the selected room type. In addition, "user computing device" may be referred to throughout in the singular or plural. It is contemplated that any number of user computing devices may be included in the system or may execute portions of the method for personalized space planning without deviating from the invention.

In addition, system may be operative to, at the user computing device, receive a selection of one or more preferences related to the room type, such as living room, dining room, entry way, bedroom, rumpus room, office, work out room etc. as well as a measurement for at least one wall defining the floor plan.

In some embodiments, the system may be configured to execute one or more algorithms and iteratively update the exemplary datasets through continued use of the system and execution of the methods described herein.

For example, the system may be operative to calculate, by a floor plan algorithm, any remaining wall dimensions associated with the floor plan and present or display the wall dimensions. The system may be operative to receive additional wall adjustment inputs at the touchscreen device of the plurality of user computing device in order to adjust the wall dimensions as desired or needed and store the wall adjustment inputs as a floor plan dataset on a computer memory device, refining the floor plan algorithm iteratively over the course of continued use to one that minimizes wall adjustment inputs over the floor plan dataset.

In some embodiments, the resulting floor plan may be defined by one or more zones, such as distinct areas within the layout designated by the user or identified by the system for a specific purpose or activity, discussed in further detail below.

The system may be further operative to identify at least one design element comprising at least one appliance and/or article of furniture defined by its dimensions and any limiting characteristics as a block that is functionally and dimensionally appropriate for the floor plan. This can be based on any of one or more user preferences and floor plan limitations and even zones, which will also be discussed in further detail below.

For the purpose of providing clarity, but without limiting the invention, the one or more appliances and/or articles of furniture may comprise items such as sofas, chairs, dining tables, coffee tables, entry tables, sofa tables, floor lamps, desks, televisions, consoles, bookshelves, islands, and the like. Thus, blocks comprise combinations of design elements that are configured to "fit" the floor plan and even zone provided.

One or more processors comprising the system may be configured further for operations using a design proposal algorithm for displaying at least one identified block at a user computing device display (the "design proposal"). Such operations may comprise receiving block adjustment inputs at the touchscreen of the user computing device display in order to adjust the design proposal. Such operations may further comprise storing the block adjustment inputs as a design dataset on the computer memory device referenced above and refining the design proposal algorithm to one that minimizes block adjustment inputs over the design dataset.

The design proposals may comprise blocks of design elements, such as any number of articles of furniture and/or appliances, defined by their dimensions and any limiting characteristics. In some embodiments, the system is configured to identify, and therefore display as design proposals, only those blocks that are functionally and dimensionally appropriate for the room type, zone, and floor plan As such, it is contemplated that blocks may comprise, as limiting characteristics, minimum space requirements including clearance for walking and for comfort, anchor point restrictions (that is, requirements that any portion of a design element be "anchored" to or abutting an architectural element of the floor plan or other design element in the block), and any configuration restrictions (such as directional restrictions).

In some embodiments, the system may be configured to receive, by the user computing device or at the computer terminal, as the case may be, a selection of a design proposal; and populate the floorplan with the selected design proposal in accordance with the one or more user preferences and floor plan limitations.

It is further contemplated that the system may be configured to receive user-specified filters, or preferences, that further restrict the design proposals, visual tools for conveying the user's creative taste, style, and aesthetic for each floor plan, and display hyperlinked shopping lists populated with one or more appliances and/or articles of furniture that conform to the dimensions and any limiting characteristics defining the one or more design elements in each block.

It is contemplated that providing a system and method for personalized space planning according to the disclosure and claims provided below may ease difficulties associated with interior design.

It is one object of the invention to reduce the complexity of interior design for amateur users.

It is another object of the invention to leverage AI in order to transform user inputs like sketches, blueprints, and preferences into detailed, personalized interior design plans.

It is another object of the invention to leverage AI in order to propose acceptable, space-dependent interior design solutions.

It is yet another object of the invention to deliver customized interior design suggestions based on the individual tastes and preferences of each user, as well as budget and physical space constraints.

It is still another object of the invention to provide a more complete solution to amateur interior design by combining visualization, mood boarding, and shopping guidance in a single platform.

It is yet another object of the invention to streamline the design-to-purchase process.

It is yet another object of the invention to avoid biased shopping guidance baked into retailer-specific design visualization systems.

It is yet another object of the invention to translate interior design inspiration to personalized design proposals and/or solutions.

It is another object of the invention to reduce reliance on professional designers.

It is another object of the invention to integrate a broad range of e-commerce retailers and platforms, offering a wider range of products and price points.

One or more of the above-disclosed embodiments, in addition to certain alternatives, are provided in further detail below with reference to the attached figures. The disclosed subject matter is not, however, limited to any particular embodiment disclosed.

Figure 1:
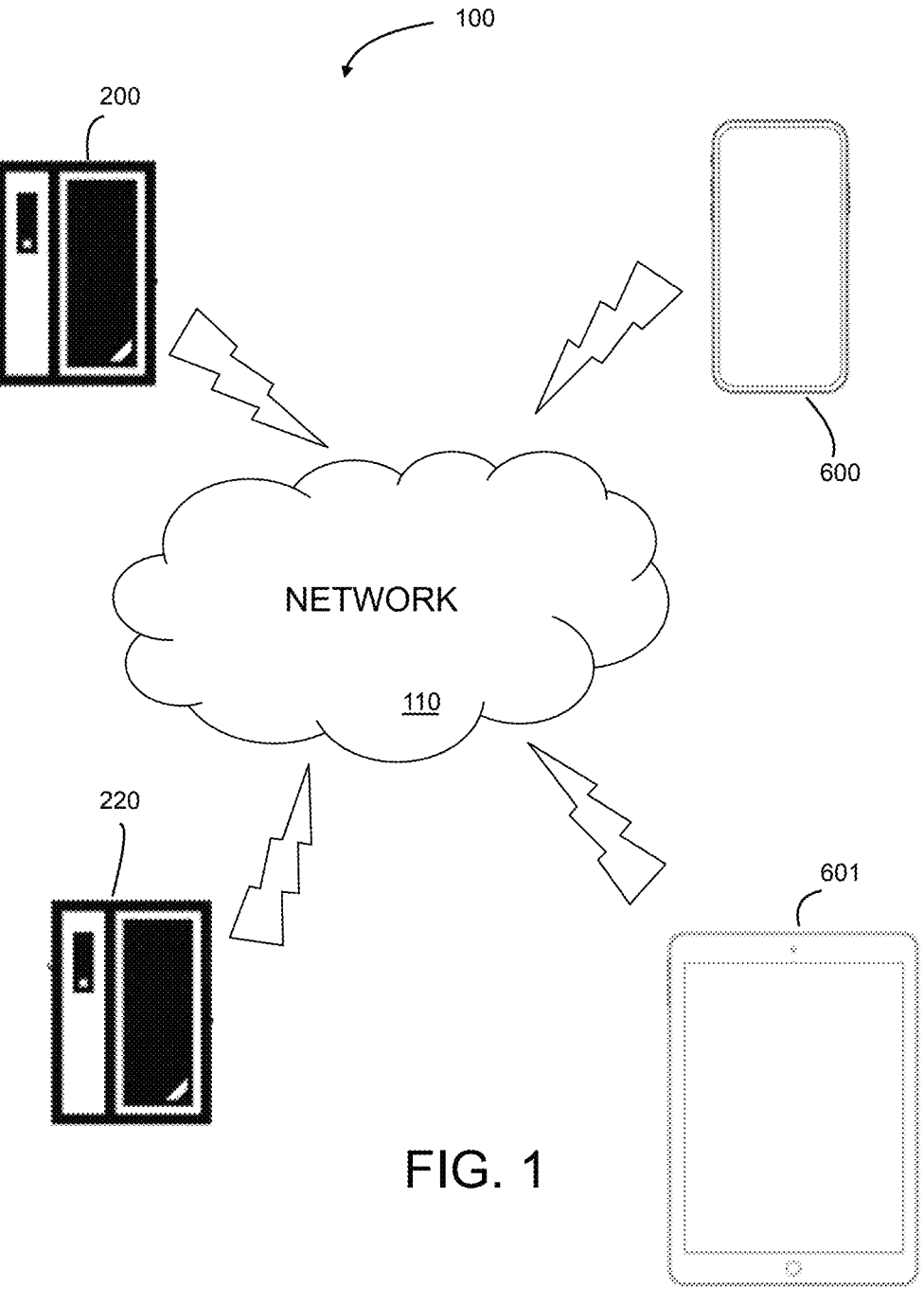
FIG. 1 is an exemplary illustration of a personalized space planning system in accordance with one embodiment of the invention.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

FIG. 1 illustrates a system for personalized space planning 100 according to one embodiment of the invention. The system 100 generally includes a personalized space planning server system 200 that is configured to communicatively couple with a plurality of user computing devices 600, 601. The personalized space planning server system 200 may be distributed on one or more physical servers, each having one or more processors, memory, an operating system, input/output interfaces, and one or more network interfaces all known in the art, and all coupled, along with the plurality of user computing devices 600, 601, through a communication network 120, such as a public network (e.g., the Internet and/or a cellular-based wireless network) or a private network.

The user computing device may include, for example, mobile device 600, 601 (e.g., smartphone, tablet, etc.), desktop or laptop device, any computer terminal, or other devices with computing capability and network interfaces, and so on. The particular type of user computing device shall not limit the invention.

Figure 2:
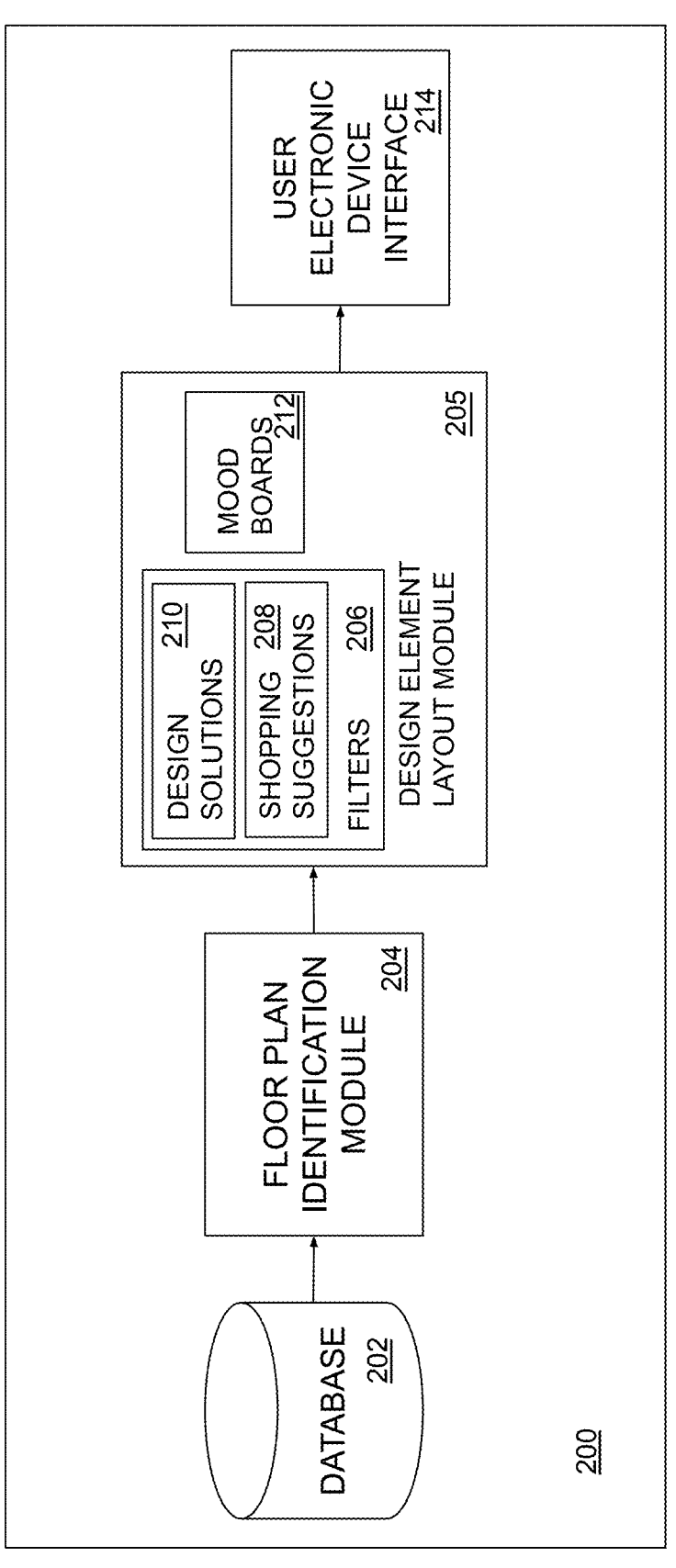
FIG. 2 illustrates an exemplary user-input sketch and digitally rendered floor plan in accordance with one embodiment of the invention.

With reference to FIG. 2, various embodiments of a system 200 for personalized space planning comprises a database 202, a floor plan identification module 204, and a design element (or furniture and appliance) layout module 205 operative to receive and utilize user preferences, or filters 206, generate and display (or, in other words, present) shopping suggestions 208, and generate and display design proposals 210. The system 200 may be further operative to populate and display mood boards 212, or other visual tools for memorializing and conveying a user's creative taste, style, and aesthetic for each floor plan(s).

The system 200 further comprises a user computing device interface 208 implemented with technology known in the art for communication with user devices, such as user computing device 600. The system 200 may also include an interface implemented with technology known in the art for communication with other computer server systems, e.g. retailer server system 220 of FIG. 1.

Returning to FIG. 2, it is contemplated the system 200 may be used in association with cloud computing, computing for mobile and wireless applications, open-source computing, web services, grid or mesh computing, and any other computing means, platforms, and the like.

In an embodiment, the database 202 may comprise any and all information and data, or some set or subset of data, relating to floor plans (or more colloquially, room types), interior design elements, and even interior design principles. This may comprise, for example only and not limitation, floor plan (or room type) data, and design element (or individual furniture and appliances) data—including their dimensions—and guidelines for furniture and appliance placement within a the floor plan, that is, according to any limitations accounted for in the floor plan data, and relative to one another.

It will be recognized that the database may be, to some extent, populated by a data subscriber comprising any suitable software, application programming interface, or the like, configured to retrieve and/or receive data from the database 202 or from one or more data sources. In some embodiments, then, the database 202 may comprise unstructured datasets publicly available on the internet such as, for example only and not limitation, design information contained in the news and published articles, blogs, forums, trade journals, other internet resources, and the like. As such, it may be seen that the particular source of data comprising datasets within the database 202 will not limit the invention. In addition, it is contemplated that the datasets may be iteratively updated through continued use of the system and execution of the methods described herein.

Figure 3A:
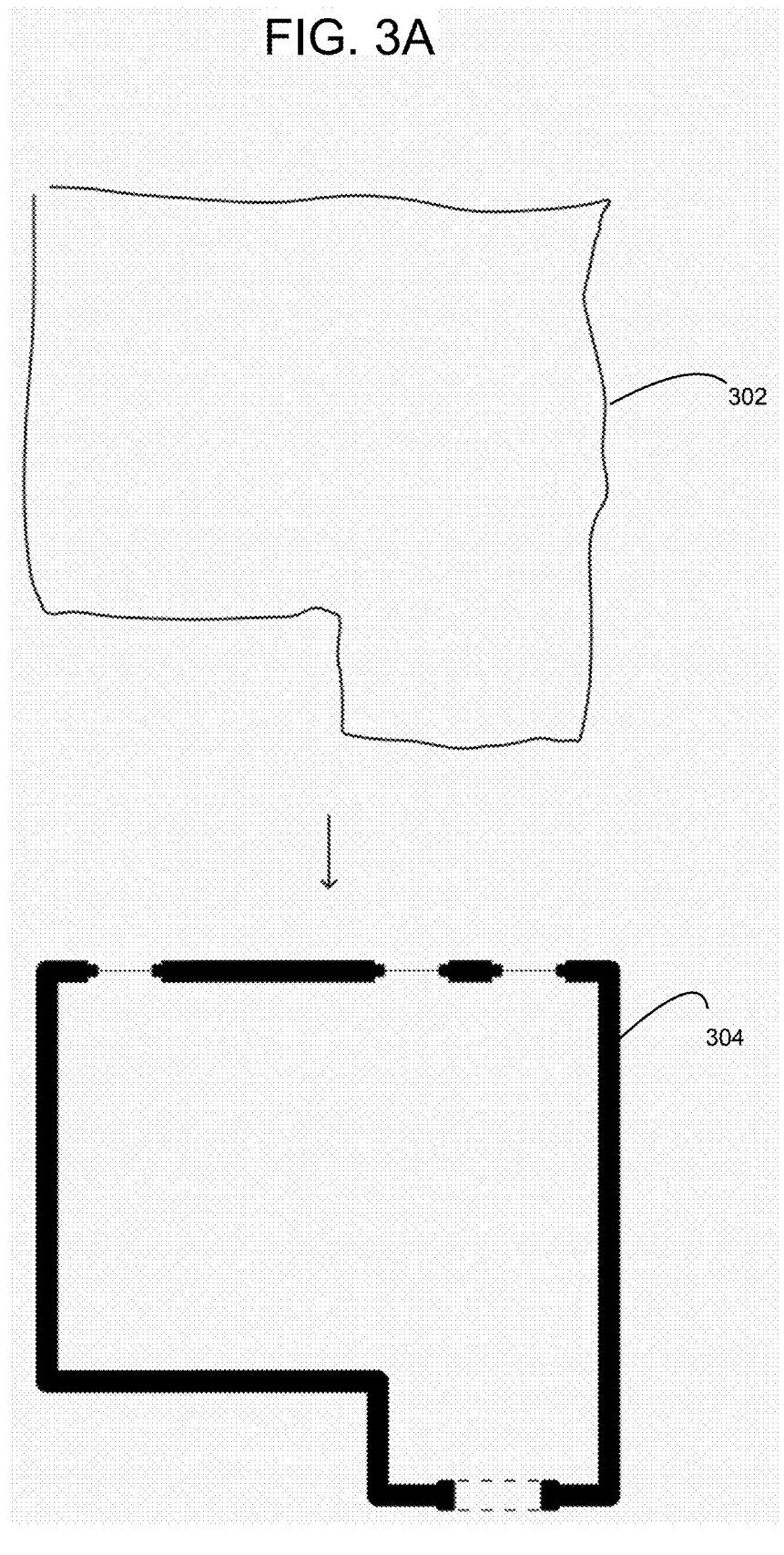
FIGS. 3A and B illustrates an exemplary user-interface in accordance with one embodiment of the invention.
Figure 3B:
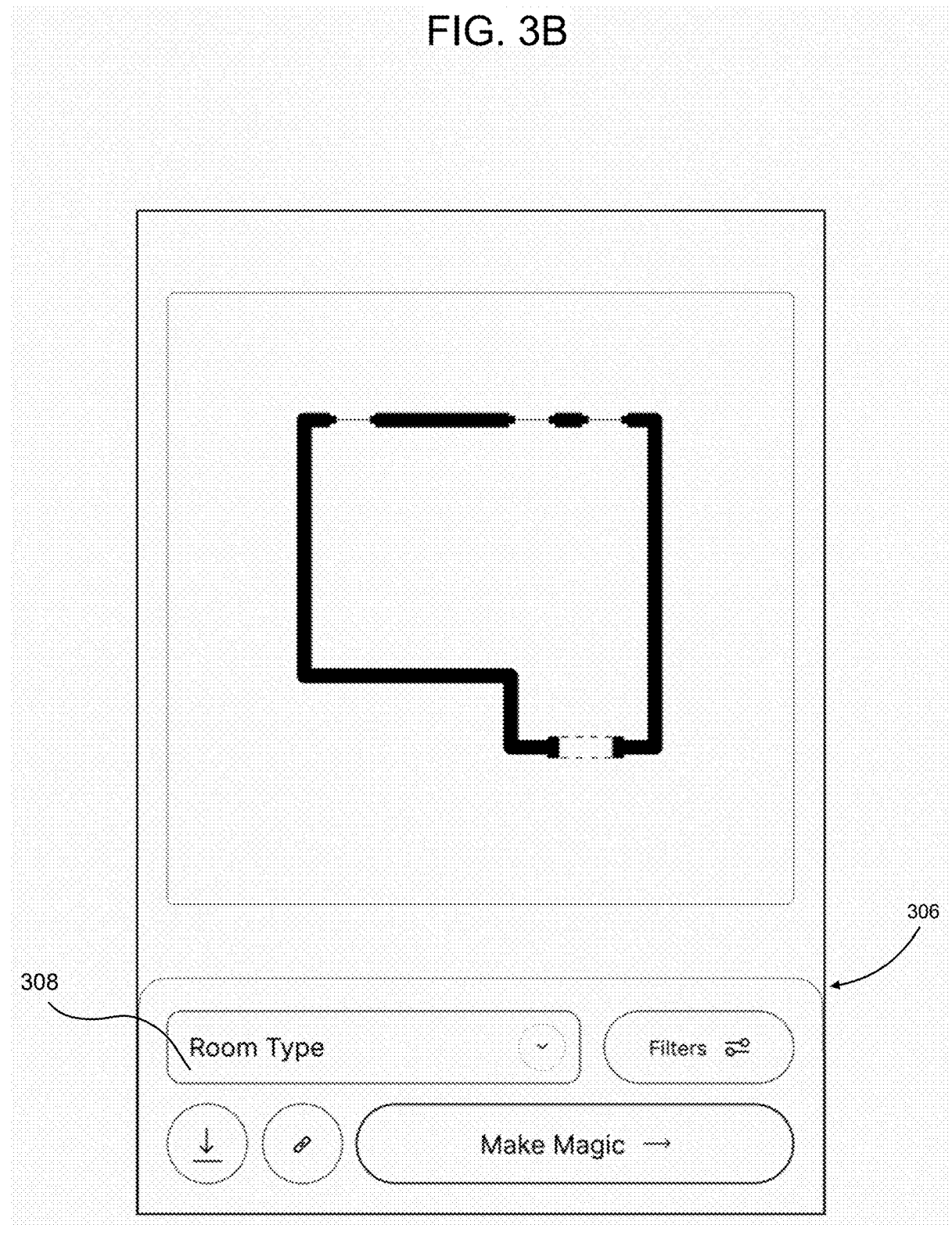

System 200 may further comprise a floor plan identification module 204 configured to, in some embodiments, receive user input floor plan sketches 302 via a touchscreen associated with the user computing device and convert such sketches in to digitally rendered floor plans 304, as shown, for example, in FIG. 3A for display on an interactive graphical user interface 306, as in exemplary FIG. 3B. This may itself comprise additional software, such as web services, application programming interfaces, and the like, configured to perform a portion of the method herein discussed. Indeed, various embodiments of the system 200 may comprise various software components configured to aid conversion of user input floor plan sketches and building and training machine learning models as applied to dataset(s) comprising the database 202. In some exemplary embodiments, a machine learning model may be trained with aesthetic guidelines that indicate how database design elements can, should, or may be placed relative to one another to create harmonious, functional, and pleasing spaces. In particular, the machine learning model may be trained to define "blocks" comprising combinations of design elements or furniture layouts, and each block may be assigned by the system to a zone within an identified floor plan, such as distinct areas within the layout designated by the user or identified by the system for a specific purpose or activity.

In one exemplary embodiment, in order to identify or otherwise define floor plans for decorating, the system may comprise one or more processors configured for receiving a selection of a room type 308 at the user computing device, and receive a selection of one or more preferences related to the room type. For instance, in some embodiments, preferences may aid identification of one or more zones, or distinct areas within the layout designated by the user or by the system for a specific purpose or activity.

The processors may further be configured to display, or present, a plurality of additional elements as floor plan limitations. In some embodiments, the additional elements may comprise architectural elements such as windows, doors, fireplaces, shelving, cabinetry, openings, niches, and the like to populate a digitally rendered or recorded floor plan (or room shape) on the user computing device touchscreen.

In an embodiment, the processors may be further configured to record user input sketch(s) of room shape as a floor plan via the touchscreen.

Such processors may be further configured to calculate wall dimensions associated with the recorded sketch and presenting the wall dimensions on the computer terminal, receive any wall adjustment inputs at the touchscreen device of the at least one user computer terminals to adjust the wall dimensions, and store the wall adjustment inputs as a floor plan dataset on the computer memory device. The floor plan algorithm may of course be refined to one that minimizes wall adjustment inputs over the floor plan dataset.

For example, in some embodiments, the system may be operative to calculate, by a floor plan algorithm, any remaining wall dimensions associated with the floor plan and present or display the wall dimensions. The system may be operative to receive additional wall adjustment inputs at the touchscreen device of the plurality of user computing device in order to adjust the wall dimensions as desired or needed and store the wall adjustment inputs as a floor plan dataset on a computer memory device, refining the floor plan algorithm iteratively over the course of continued use to one that minimizes wall adjustment inputs over the floor plan dataset.

In some embodiments, the resulting floor plan may be defined by the one or more of the zones.

In addition, the one or more processors may be configured further for operations within the design element layout module 205 for providing or generating one or more suggested furniture layouts, or design proposals, at the user computing device display.

In some embodiments, for instance, one or more processors comprising the system may be configured further for such operations using a design proposal algorithm for displaying at least one identified block at a user computing device display as the design proposal. Such operations may comprise receiving block adjustment inputs at the touchscreen of the user computing device display in order to adjust the design proposal. Such operations may further comprise storing the block adjustment inputs as a design dataset on a computer memory device discussed in further detail elsewhere and refining the design proposal algorithm to one that minimizes block adjustment inputs over the design dataset.

The design proposals themselves may comprise blocks of design elements, such as any number of articles of furniture and/or appliances, defined by their dimensions and any limiting characteristics. In some embodiments, the system may be configured to identify, and therefore display as design proposals, only those blocks that are functionally and dimensionally appropriate for the room type, zone, and floor plan. As such, it is contemplated that blocks may comprise, as limiting characteristics, minimum space requirements including clearance for walking and for comfort, anchor point restrictions, and any configuration restrictions.

In some embodiments, the system may be configured to receive, by the user computing device or at the computer terminal, as the case may be, a selection of a design proposal; and populate the floorplan with the selected design proposal in accordance with the one or more user preferences and floor plan limitations.

The one or more processors may be further configured further for operations comprising receiving adjustment inputs for the design proposal at the touchscreen of the user computing device to adjust the furniture the furniture layout.

In addition, the one or more processors may be configured further for operations comprising storing the block adjustment inputs as a design dataset on the computer memory device and refining the design proposal algorithm to one that minimizes block adjustment inputs over a design dataset with the database 202.

For example, in one embodiment, the design proposal algorithm may be configured to calculate optimal layouts for adding blocks of design elements to a floor plan, taking into account limiting characteristics of any design elements comprising the blocks, user preferences, and floor plan limitations. In other words, calculating optimal layouts may involve identifying at least one design element as a block that at least one appliance or article of furniture defined by its dimensions and any limiting characteristics and that is functionally and dimensionally appropriate for the floor plan based on any of one or more user preferences and floor plan limitations.

The one or more processors may additionally be configured to display a plurality of additional elements as floor plan limitations. These may be addable to the floor plan by dragging and dropping;

In some embodiments, receiving a selection of a design proposal, logging any user selections of links and purchases from e-commerce platform selling one or more appliances or articles of furniture that reflect the dimensions and any limiting characteristics defining the one or more design elements in each block may be used by the system to further refine the design proposal algorithm.

Figure 4:
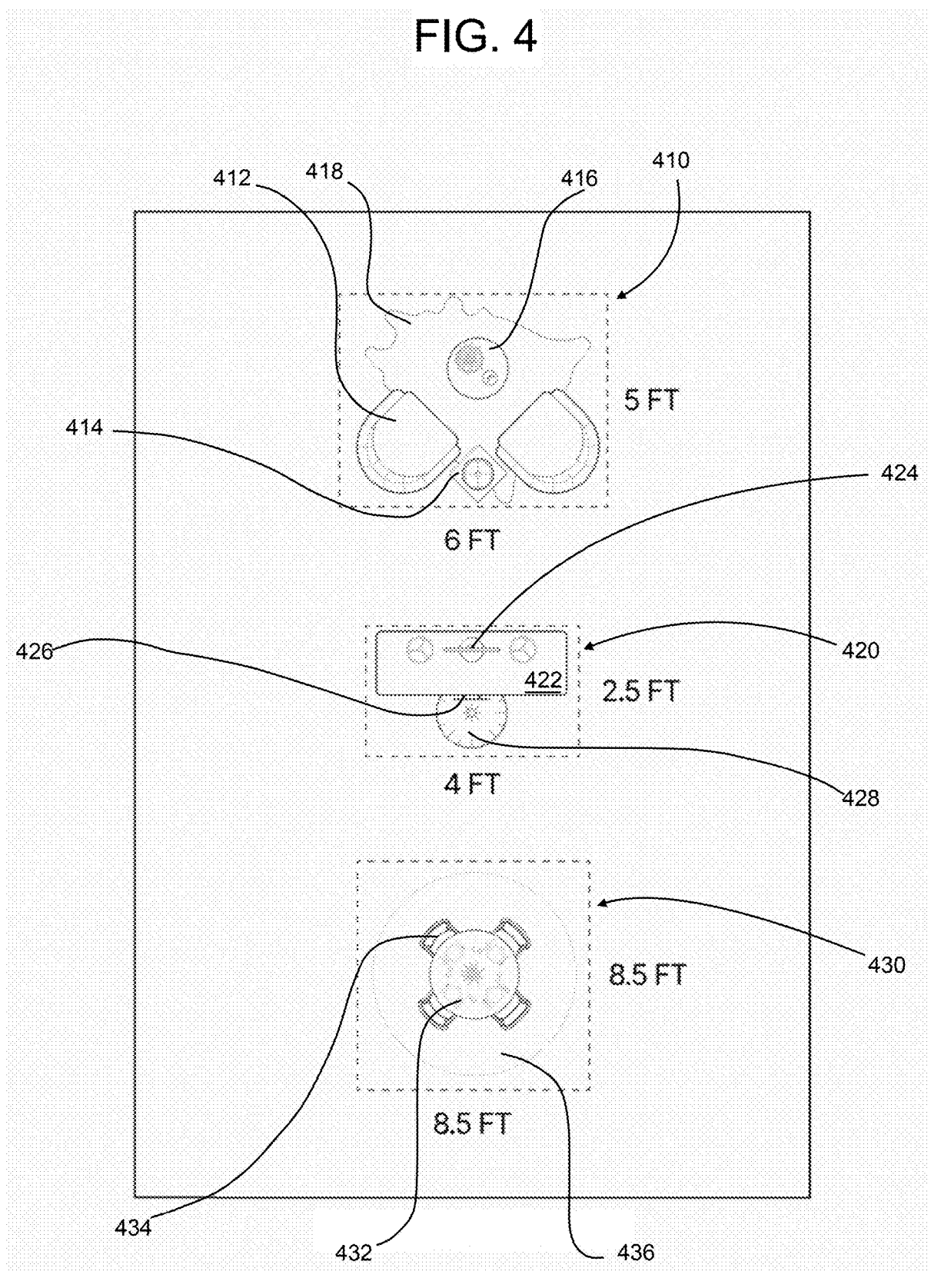
FIG. 4 illustrates exemplary design element blocks and their dimensions in accordance with some embodiments of the invention.

More particularly, exemplary blocks defining furniture layouts as may be displayed on a graphical user interface (described in further detail below) are reflected in FIG. 4. For instance, exemplary block 410 comprises a pair of chairs 412, side table 414, coffee table 416, and rug 418 which may be assigned to a lounging zone within a given floor plan or space. Exemplary block 420 comprises a desk 422, computer 424, task chair 426, and rug 428, which may be assigned to a task or work zone within a given floor plan or space. Exemplary block 430 comprises a dining table 432, four chairs 434, and a rug 436, which may be assigned to a dining zone within a given floor plan.

In some embodiments, each block is defined not only by the design elements it contains and zone to which it might belong but also by the dimensions of its footprint. It is contemplated that this allows the system to generate and display only those blocks as proposed designs which are appropriately scaled for the particular layout and any additional blocks, as the case may be, and as may be determined by the machine learning model applied to any database dataset(s).

As additional non limiting examples, blocks may comprise living room layout, lounge zone design elements such as any combination of sofa, coffee table, armchair(s), pouf (s), and/or loveseat(s); dining room layout, dining zone design elements such as any combination of a dining table, bench(s), and chairs; work or task zone design elements such as any combination of an office desk, computer, and task chair(s); entertainment zone design elements such as any combination of a media console and/or television; bedroom layout, sleep zone design elements such as any combination of a bed, rug, side table(s), and/or bench, and the like. Of course, the foregoing is offered by way of example only and not limitation. Blocks can comprise innumerable combinations of design elements, and particular space layouts may be more or less, and thus the invention is not to be limited by the recitation of particular design elements, combinations of design elements, or even blocks. The system may be configured to define any number of blocks comprising a vast variety of furniture and/or appliances.

Returning to FIG. 2, the machine learning model may be trained interior design guidelines and/or preferences that detail suggest that detail the relative placement of each design element within a block to one another. For instance, some guidelines suggest accounting for about 24 inches of table length per person for seating. Additional guidelines for clearance (discussed in further detail below) suggest leaving about 36 inches between the table edge and surrounding walls or furniture for comfortable chair movement. Still other guidelines suggest placement of certain design elements relative to openings, such as doors and windows, for various reasons including avoiding glare from the sun, preventing dangerous blockage of doorways, and many others.

As a more particular example illustrating non-limiting types of guidelines that may be used to train the machine learning model of system 200, there are in the field of art a number of guidelines related to the types and sizes of rugs that pair best with particular bed sizes. Some suggest pairing an approximately seven- to eight-foot by 10-foot rug with a standard queen-sized bed, while a nine-foot by 12-foot rug provides "better" balance and coverage for the area below and around a standard king-sized bed. Of course, one of ordinary skill in the art will recognize that there are countless permutations of combinations of interior design elements and their placement within a space. With respect to the exemplary rug and bed size combinations, alternative guidelines include pairing two four-foot by six-foot rugs or seven-foot by 10-foot rugs along or just under the outside vertical edges of a queen-sized bed, respectively. As still another alternative guideline, some propose placing runners or area mats in high traffic areas to the sides of or at the foot of a bed. Of course, these are provided as non-limiting example for the purpose of clarifying just some of the possible guidelines that can be used to train the machine learning model. It is contemplated that the system 200 may be continually trained to account for these and other design element permutations that exist or as may be developed or reflected in current trends, such as table size and shape, chair type, sofa size and shape, television size, etc. for any and all contemplated floor plans and zones.

As such, the floor plan identification module 204 may be configured and operative to analyze any dataset(s) within the database 102 of FIG. 1, originating from one or more data sources, in order to identify potential design solutions for a particular space and ultimately populate floor plans with such solutions, further narrowed by a user's preferences, on the user computing device display.

Figure 5A:
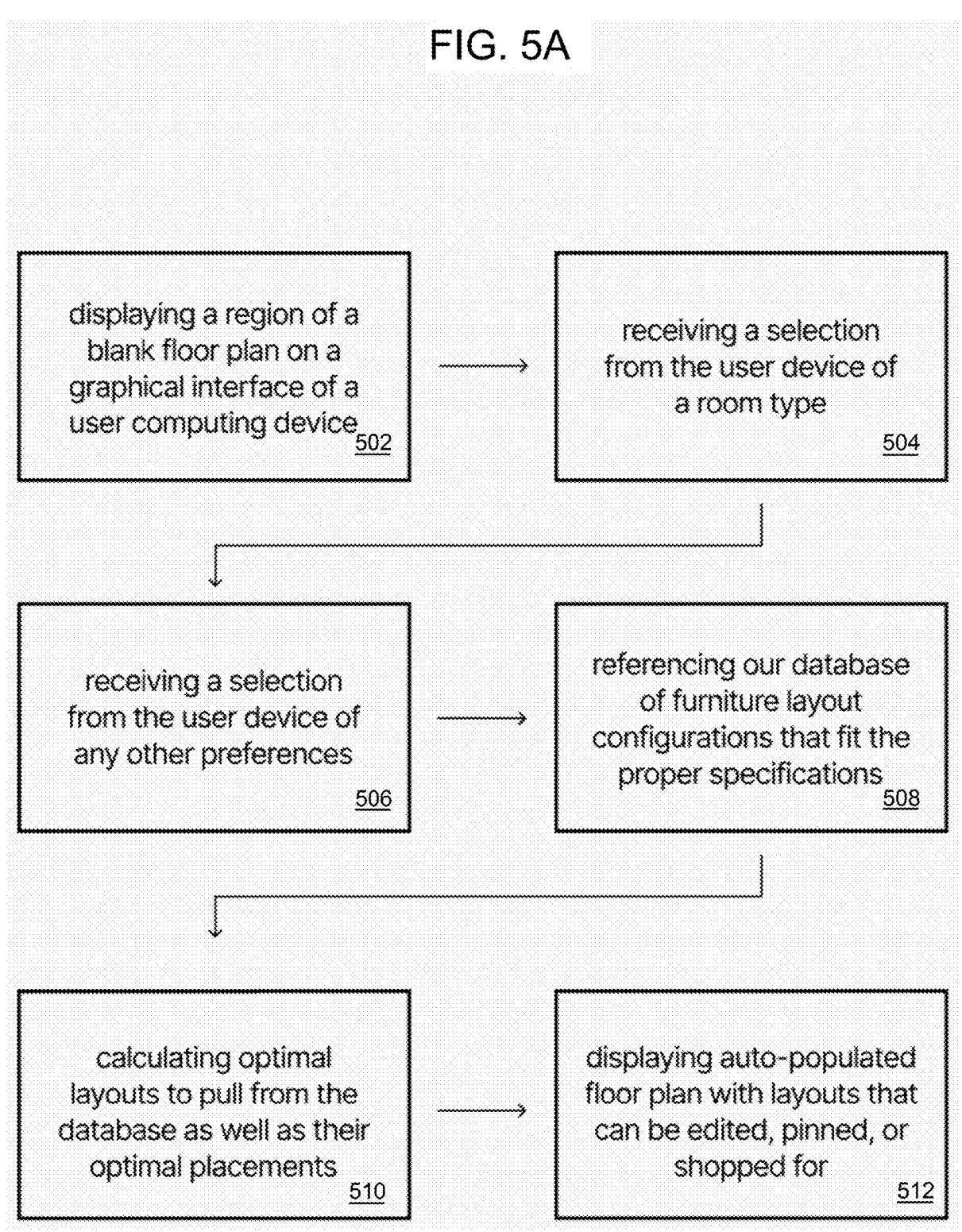
FIG. 5A is an exemplary flowchart illustrating a method for personalized space planning in accordance with one embodiment of the invention.

FIG. 5A is a flowchart depicting an exemplary embodiment of a method for personalized space planning such as may be performed by user computing device 600 and 601 of FIG. 1 to facilitate the aforementioned functionality. That is, in one embodiment, a user computing device is operative to perform, at least in part, the method depicted in the flowchart of FIG. 5A, including the steps of: displaying a region of a blank floor plan on a graphical interface of a user computing device (block 502); receiving a selection from the user device of a room type (or floor plan) (block 504); receiving a selection from the user device of any other preferences (as filters) (block 506), which could include such things as capacity (of the space or of the design element as desired or needed), shape, size, and any limiting characteristics of any necessary or desired design elements, among others; referencing the system database of furniture layout configurations (or "design dataset," comprising, in part design element blocks referenced throughout) that fit the filtered specifications (block 508); calculating optimal layouts (block 510); and displaying one or more auto-populated floor plans with design element layouts that can be edited, pinned (or saved), or shopped for (block 512) on the user computing device display.

Calculating optimal layouts may comprise, more particularly, identifying, by a design proposal algorithm, at least one block that is functionally and dimensionally suited to or appropriate for the floor plan based on any of one or more user preferences and floor plan limitations.

Figure 5B:
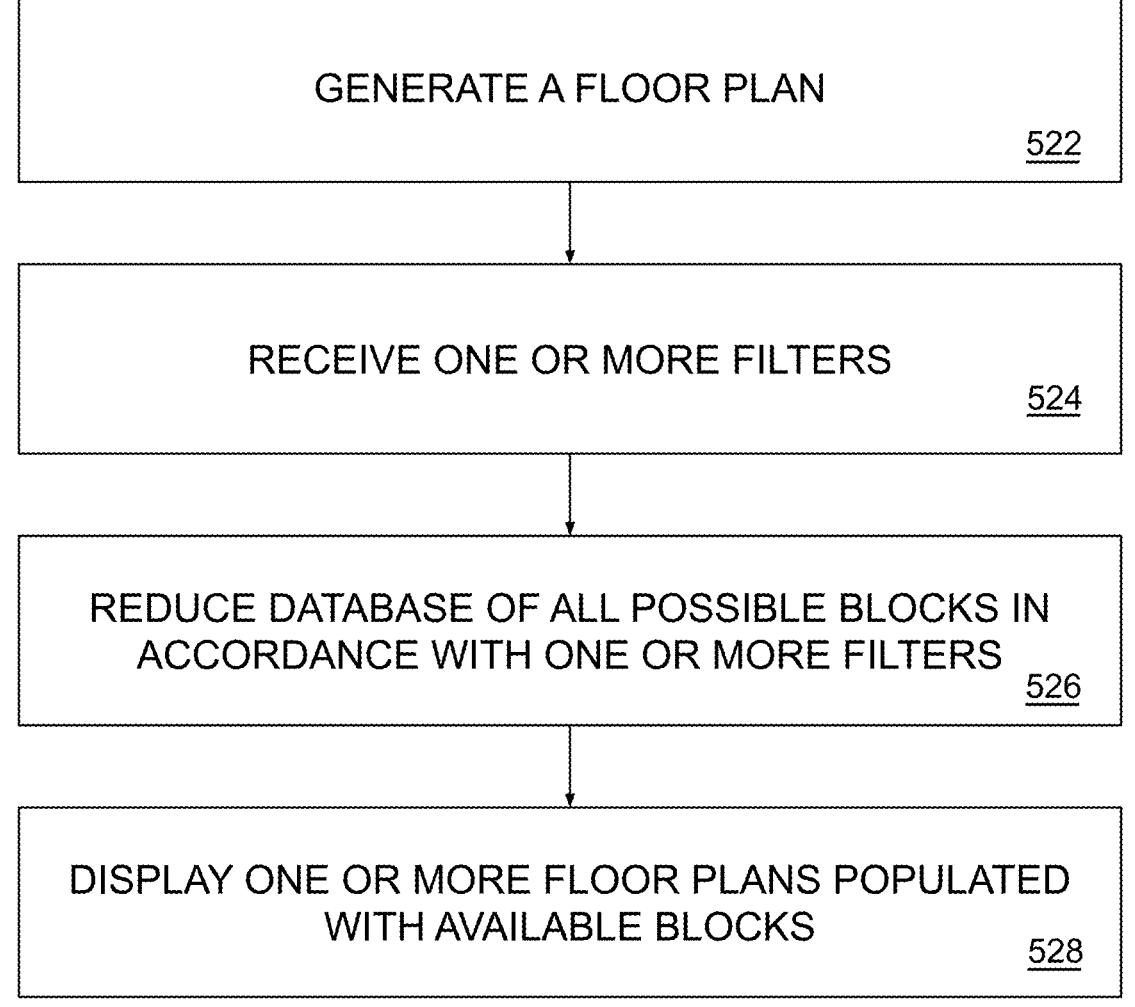
FIG. 5B is another exemplary flowchart illustrating a method for personalized space planning in accordance with one embodiment of the invention.

With respect to operation of system for personalized space planning 200, system 200 may be operative to more generally perform, at least in part, the method depicted in the flowchart of FIG. 5B. Specifically, the method includes the steps of: generating a floor plan (block 522) based, for example, on a user input sketch; receive one or more filters (block 524) as may be determined by space, zone and design element capacity, user preference, and the like; reduce the database of all possible blocks in accordance with the one or more filters (block 526); and display the one or more alternative floor plans populated with available filtered blocks (block 528).

Of course, the sequence of steps in the user's design journey within the system for personalized space planning (such as mood board matchmaking of blocks, floor plan sketching, and shopping list generation) can be modified (based on user feedback or preferences) without impacting the essential outcome of generating a personalized space design.

If embodied in software, it should be noted that each block depicted in the accompanying flowcharts represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as user computing device the user computing device. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

Figure 6:
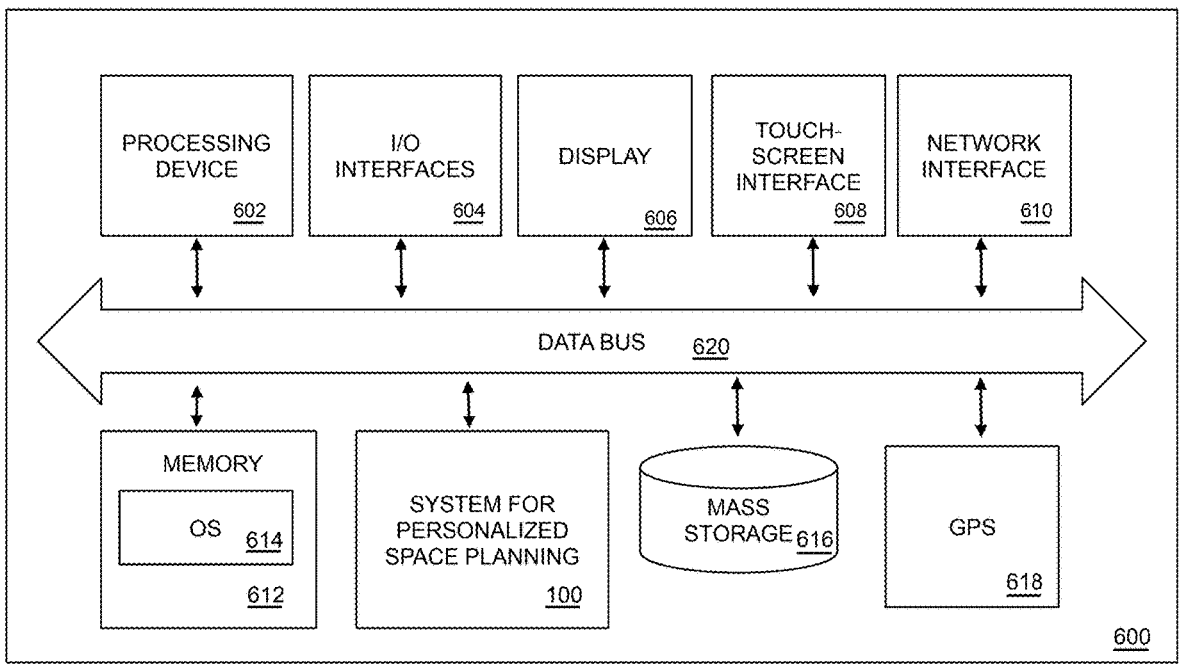
FIG. 6 is an exemplary block diagram of a computing device in accordance with one embodiment of the invention.

FIG. 6 illustrates an exemplary user device as referenced above. Such user computing device 600 may be a tablet computer or smartphone but may also be embodied in any one of a wide variety of wired and/or wireless computing devices. As shown in FIG. 6, user computing device 600 includes a processing device (processor) 602, input/output interfaces 604, a display 606, a touchscreen interface 608, a network interface 610, a memory 612, and operating system 614, a mass storage 616 and an GPS 618, with each communicating across a local data bus 620. Additionally, user computing device 600 incorporates a system for personalized space planning 100, which may include user floor plans, filters, design proposals, mood boards, and even shopping suggestions, among others, although the location of this information could vary.

The processing device 602 may include any custom made or commercially available processor, a central processing unit (CPU) or an auxiliary processor among several processors associated with the user computing device 600, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 612 can include any one of a combination of volatile memory elements (e.g., random-access memory (RAM, such as DRAM, and SRAM, etc.)) and nonvolatile memory elements. The memory typically comprises native operating system ("OS") 614, one or more native applications, emulation systems, or emulated applications for any of a variety of operating systems and/or emulated hardware platforms, emulated operating systems, etc. For example, the applications may include application specific software which may comprise some or all the components of the user computing device 600. In accordance with such embodiments, the components are stored in memory and executed by the processing device. Note that although depicted separately in FIG. 6, the system and method for personalized space planning 100 may be resident in memory such as memory 612.

Touchscreen interface 608 is configured to detect contact within the display area of the display 606 and provides such functionality as on-screen buttons, menus, keyboards, etc. that allows users to not only navigate user interfaces by touch, but also to supply user input sketches via finger, stylus, or some other means capable of detection within the display area of the display 606. In some embodiments, the user computing device 600 still further comprise GPS 618 or other means to determine the location of the user computing device 600. For instance, the user's location may aid filtration of geographically relevant design elements and guidelines.

One of ordinary skill in the art will appreciate that the memory 614 can, and typically will, comprise other components which have been omitted for purposes of brevity.

Note that in the context of this disclosure, a non-transitory computer-readable medium stores one or more programs for use by or in connection with an instruction execution system, apparatus, or device. With further reference to FIG. 6, network interface device 610 comprises various compo- nents used to transmit and/or receive data over a networked environment such as depicted in FIG. 1. When such com- ponents are embodied as an application, the one or more components may be stored on a non-transitory computer- readable medium and executed by the processing device.

Figure 7:
FIG. 7 illustrates another exemplary design element block in accordance with one embodiment of the invention.

Blocks may be defined by limiting characteristics other than the design elements that comprise them. For instance, FIG. 7 illustrates an exemplary block 700 that comprises additional empty space as "clearance." One of ordinary skill in the art will recognize that clearance is the minimum space required around furniture and architectural features, such as windows and fireplaces, to ensure ease of movement, acces- sibility, and functionality. Sufficient clearance allows people and pets to walk through spaces, open doors, pull out chairs, and use furniture comfortably without obstruction. For instance, interior design industry guidelines for clearance suggest leaving at least about 36 inches between a table edge and surrounding walls or furniture for comfortable chair movement. Of course, clearance may depend on user-spe- cific preferences or use-case specific requirements. For instance, more clearance may be desirable in floor plans for spaces that are frequently occupied or traversed by users of mobility aids and/or children. Some users may simply prefer higher or lower levels of clearance for one reason or another. Thus, the system may be configured to take the guidelines and user preferences into account in this respect.

Additional system guidelines may comprise clearance ranges that include upper limit clearance amounts. Some may find that too much clearance can make a space feel empty, cold, or disconnected. Excessive spacing between design elements can disrupt flow and diminish a room's sense of cohesion and intimacy, making it less comfortable and inviting. Therefore, the system may be configured to balance minimum clearance requirements with furniture and appliance scale and placement to maintain warmth, func- tionality, and harmonious layout.

Figure 8:
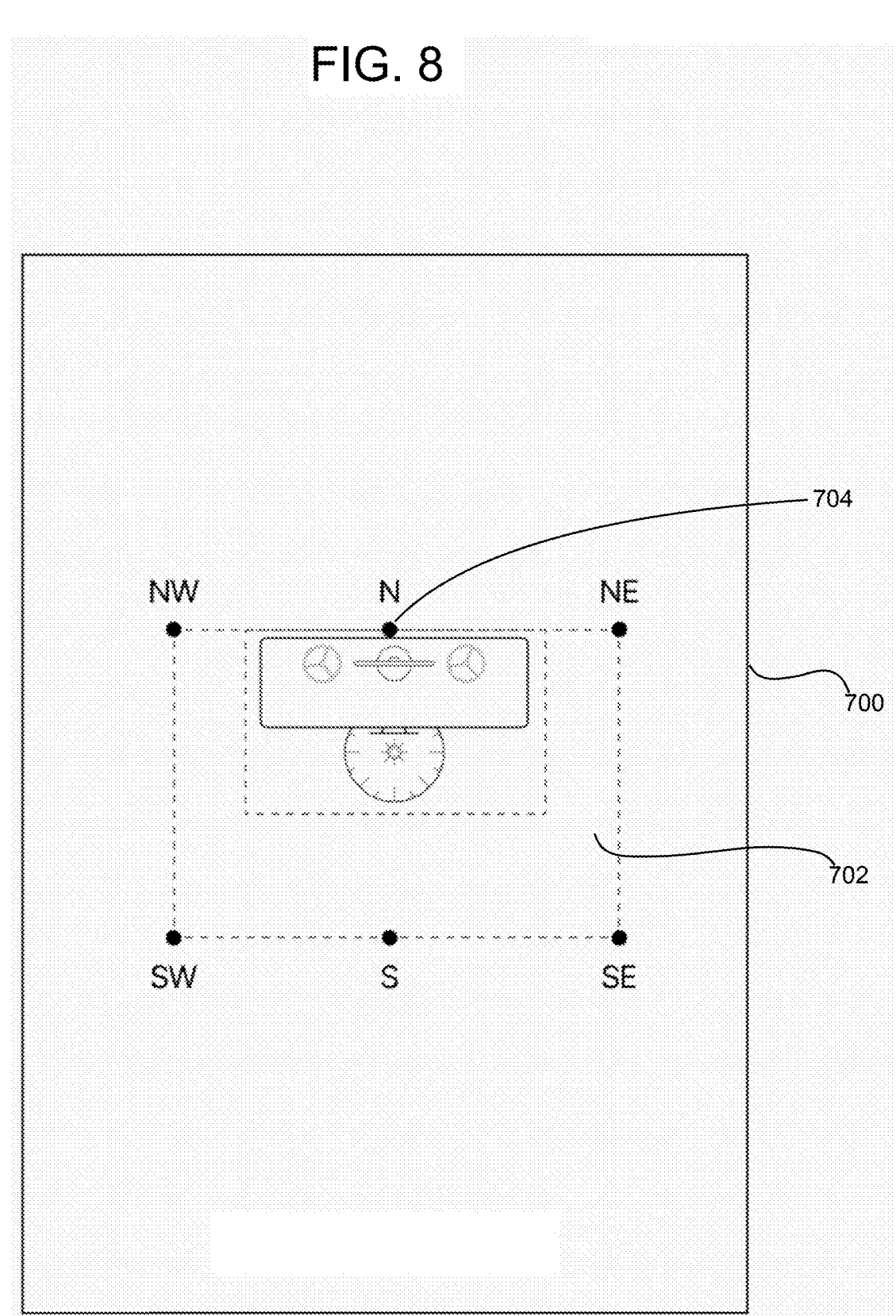
FIG. 8 illustrates yet another exemplary design element block in accordance with one embodiment of the invention.

FIG. 8, illustrates an exemplary block 700 that comprises, in addition to the aforementioned clearance, one or more anchor points as portions of a block that should be posi- tioned against—or anchored—to another block anchor point or to an architectural feature of the floor plan. It is contem- plated that the system may receive anchor points as user supplied filters and/or may define a block by anchor points as a result of guidelines used to train the machine learning model. For instance, the exemplary work zone block 700 of FIG. 8 may define a center anchor point 704 (N), which could be used to center such work zone block on a particular wall or against a particular architectural feature. Anchor points may be applied to any number of design elements and blocks, including sofas, bed headboards, media centers, credenzas, benches, and the like, though not all blocks will necessarily contain anchor points.

Figure 9:
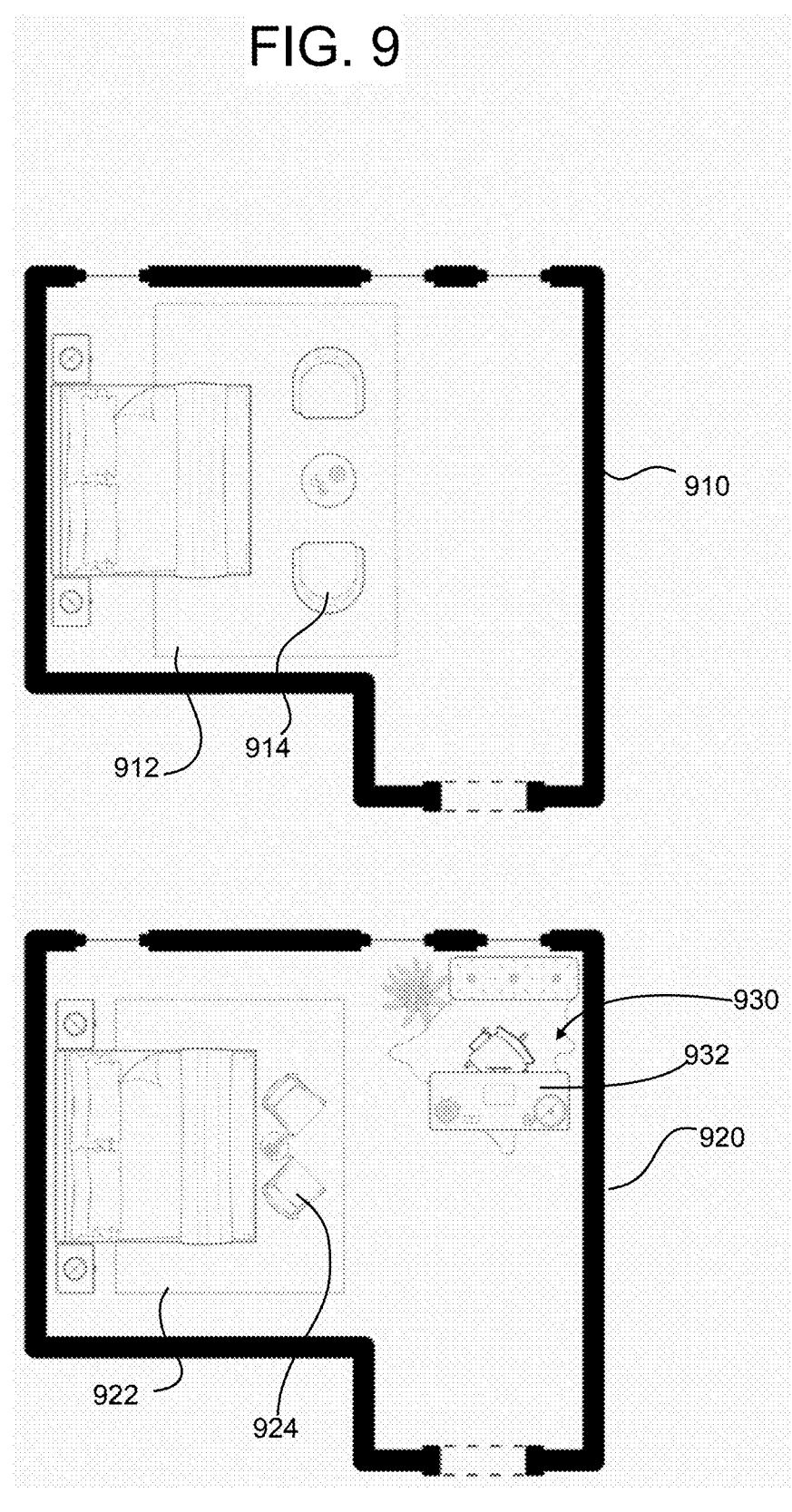
FIG. 9 illustrates alternative exemplary floor plans in accordance with one embodiment of the invention.

FIG. 9 illustrates one exemplary embodiment of alterna- tive block layout proposals by the system for a given space 910, 920. Though two proposals are shown for the sake of brevity and clarifying example, it is contemplated that the system for personalized space planning will be operative to identify many possible block permutations that depend on and reflect any user input sketch, space dimensions, and user supplied filters regarding desired or necessary zones within the space and/or design block capacity. In this example, it may be seen that scaling down the size of rug 922 and chairs 924 of block layout 920, as compared to rug 912 and chairs 914 of block layout 910, defining a sleep zone in the space leaves room for an additional work zone 930 that includes a desk 932 and other design elements, which would otherwise be crowded out by the sleep zone chairs 914. Thus it may be seen that system consideration for block-specific clearance and anchor point requirements may ensures that a user will comfortably fit in the space. It is contemplated that the system may receive and display adjustments to block layout proposals via user interaction with the touchscreen of their electronic device.

Figure 10:
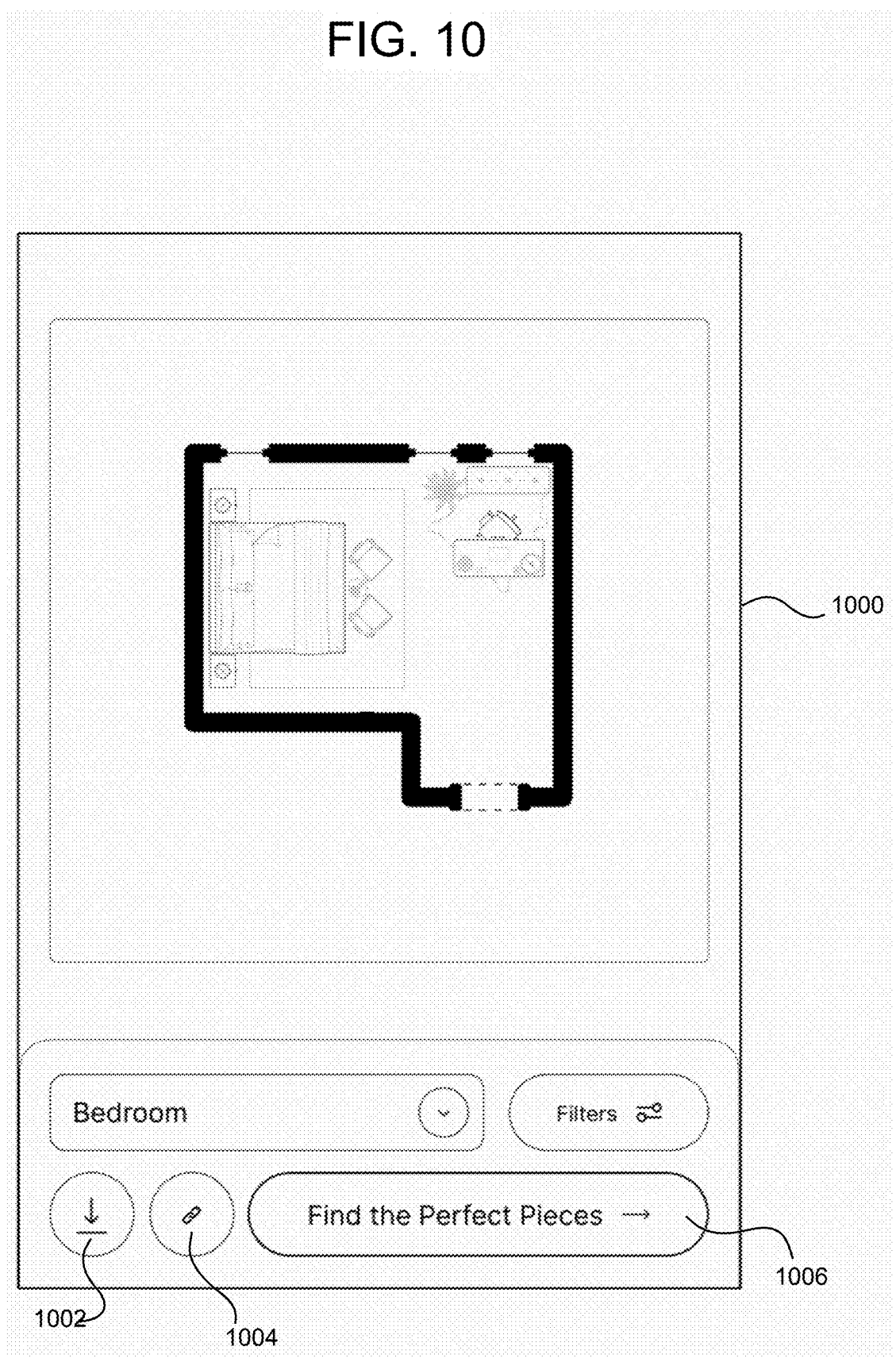
FIG. 10 illustrates an exemplary furnished floor plan user computing device display in accordance with one embodiment of the invention.

Turning to FIG. 10, the user computing device 1000 may display alternative block layout proposals as selected by the user at the touchscreen. It is contemplated that "buttons" known to those of ordinary skill in the art may be provided to enable the user to save 1002 and link or share 1004 any selected block layout proposals, and even navigate 1006 to a page operative to display shoppable design elements that comply with block layout proposal features such as dimen- sions, clearance, anchor point, capacity, and others.

It should be emphasized that the above-described embodi- ments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedi- cation if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contem- plated and can be made without departing from the spirit and scope of the invention. For example, the system may be suitable for global use. As such, it is contemplated that the database may contain datasets reflecting regional design principles and elements. Indeed, the system may be opera- tive to translate any displayed writings for any particular user without altering the fundamental design generation process. Accordingly, it is intended that the invention not be limited, except as by the appended claim(s).

The teachings disclosed herein may be applied to other systems, and may not necessarily be limited to any described herein. The elements and acts of the various embodiments described above can be combined to provide further embodi- ments. All of the above patents and applications and other references, including any that may be listed in accompany- ing filing papers, are incorporated herein by reference. Aspects of the invention can be modified, if necessary, to employ the systems, functions and concepts of the various references described above to provide yet further embodi- ments of the invention.

Particular terminology used when describing certain fea- tures or aspects of the invention should not be taken to imply that the terminology is being refined herein to be restricted to any specific characteristics, features, or aspects of the system and method for personalized space planning with which that terminology is associated. In general, the terms used in the following claims should not be constructed to limit the system and method for personalized space planning to the specific embodiments disclosed in the specification unless the above description section explicitly define such terms. Accordingly, the actual scope encompasses not only the disclosed embodiments, but also all equivalent ways of practicing or implementing the disclosed system, method and apparatus. The above description of embodiments of the system and method for personalized space planning is not intended to be exhaustive or limited to the precise form disclosed above or to a particular field of usage.

While specific embodiments of, and examples for, the method, system, and apparatus are described above for illustrative purposes, various equivalent modifications are possible for which those skilled in the relevant art will recognize.

While certain aspects of the method and system disclosed are presented below in particular claim forms, various aspects of the method, system, and apparatus are contemplated in any number of claim forms. Thus, the inventor reserves the right to add additional claims after filing the application to pursue such additional claim forms for other aspects of the system and method for personalized space planning.

What is claimed is:

1. A computer-implemented method of producing an interior design for a room, comprising:

by one or more processors executing a floor plan algorithm and a design proposal algorithm stored in a memory device:

receiving a selection of a room type at a computer terminal;

receiving, at the computer terminal, a floor plan defining the selected room type;

receiving a selection of one or more preferences related to the room type at the computer terminal;

receiving, at the computer terminal, a measurement for at least one wall defining the floor plan;

executing the floor plan algorithm to calculate any remaining wall dimensions associated with the floor plan based on the received measurement and a stored floor plan dataset, and displaying, on the computer terminal, the calculated wall dimensions on the computer terminal;

receiving, at the computer terminal, an input to adjust the wall dimensions;

displaying, at the computer terminal, a plurality of additional elements as floor plan limitations addable to the floor plan by dragging and dropping;

executing the design proposal algorithm configured to i) analyze a database of design element blocks, each block comprising a plurality of related design elements pre-configured as a single placement unit with shared limiting characteristics applying to the block as a whole, such limiting characteristics defined by a) dimensions defining the block's footprint, b) clearance requirements comprising at least a minimum clearance value for the block as a whole, c) anchor points defining required positional relationships between the block and architectural features of the floor plan, each anchor point comprising a directional designation indicating a required orientation of the block relative to the architectural feature, and d) configuration restrictions, and to ii) identify at least one block of related design elements that is functionally and dimensionally appropriate for the calculated floor plan, including its clearance requirements and anchor points, based on the one or more user preferences and floor plan limitations;

displaying at the computer terminal, at least one identified block as a design proposal;

receiving, at the computer terminal, a selection of a design proposal; and automatically populating the floorplan, at the computer terminal, with the selected design proposal such that the at least one identified block as the design proposal is positioned in accordance with the calculated wall dimensions, clearance requirements, anchor points, one or more user preferences, and floor plan limitations.

2. The computer-implemented method of claim 1, wherein receiving the floor plan comprises presenting, at the computer terminal, a display screen with a window for a sketch of a room shape and recording a sketch of the room shape input via a touchscreen device associated with the computer terminal.

3. The computer-implemented method of claim 1, wherein receiving the floor plan comprises receiving, at the computer terminal, a digital blueprint of the floor plan defining the selected room type.

4. The computer-implemented method of claim 1, wherein the floor plan limitations include one or more of a fireplace, a window, shelving, cabinetry, a niche, and a wall opening.

5. The computer-implemented method of claim 1, further comprising receiving, at the computer terminal, an input to receive alternative design proposal selections and adjust any selected design proposal by dragging and dropping.

6. The computer-implemented method of claim 1, further comprising generating and displaying, at the computer terminal, a link to an e-commerce platform selling one or more appliances or articles of furniture that conform to the dimensions and any limiting characteristics defining the one or more design elements in each block.

7. The computer-implemented method of claim 1, further comprising providing one or more style choices and displaying a mood board on the computer terminal based on the style choice.

8. A computer system for producing an interior design for a room, comprising:

a memory device;

a plurality of user computer terminals having touchscreen devices; and one or more processors operative to execute a floor plan algorithm and a design proposal algorithm stored in the memory device and to:

receive a selection of a room type at the plurality of user computer terminals;

receive a floor plan defining the selected room type at the plurality of user computer terminals;

receive a selection of one or more preferences related to the floor plan at each of the plurality of user computer terminals;

receive a measurement for at least one wall defining the floor plan at the plurality of user computer terminals;

execute the floor plan algorithm to calculate any remaining wall dimensions associated with the floor plan and based on the received measurement and a floor plan dataset stored in the memory device, and present the wall dimensions on the computer terminal;

receive wall adjustment inputs at the touchscreen devices of the plurality of user computer terminals to adjust the wall dimensions;

display a plurality of additional elements as floor plan limitations addable to the room by dragging and dropping;

identify, by executing the design proposal algorithm, at least one block from a plurality of design element blocks, each block comprising a plurality of related design elements pre-configured as a single placement unit, each design element comprising at least one appliance or article of furniture defined by its dimensions and any limiting characteristics, wherein each block is associated with shared limiting characteristics comprising:

a) dimensions defining the block's footprint, b) clearance requirements comprising at least a minimum clearance value for the block as a whole, c) anchor points defining required positional relationships between the block and architectural features of the floor plan, each anchor point comprising a directional designation indicating a required orientation of the block relative to the architectural feature, and d) configuration restrictions, each block, as a whole, being functionally and dimensionally appropriate for the floor plan, including its clearance requirements and anchor points, based on the one or more user preferences and floor plan limitations;

display at least one identified block as a design proposal at the plurality of user terminals;

receive a selection of a design proposal at the plurality of user terminals; and populate the floorplan with the selected design proposal in accordance with the one or more user preferences and floor plan limitations.

9. The system of claim 8, wherein the one or more processors are configured further for operations comprising;

storing the wall adjustment inputs as a floor plan dataset on the computer memory device; and refining the floor plan algorithm to one that minimizes wall adjustment inputs over the floor plan dataset.

10. The computer system of claim 8, wherein the one or more processors are configured further for operations comprising using a design proposal algorithm for providing the at least one identified block at the plurality of user terminals.

11. The computer system of claim 10, wherein the one or more processors are configured further for operations comprising receiving block adjustment inputs at the touchscreen devices of the plurality of user computer terminals to adjust the design proposal.

12. The computer system of claim 10, wherein the one or more processors are configured further for operations comprising storing the block adjustment inputs as a design dataset on the computer memory device and refining the design proposal algorithm to one that minimizes block adjustment inputs over the design dataset.

13. A system for producing an interior design for a room configured to run a computer program product for interior design, the computer program product comprising non-transitory computer-readable media encoded with instructions for execution by a processor to execute a floor plan algorithm and a design proposal algorithm stored in a memory device and to perform a method comprising:

receiving a selection of a room type at a computer terminal;

receiving, at the computer terminal, a floor plan defining the selected room type;

receiving a selection of one or more preferences related to the room type at the computer terminal;

receiving, at the computer terminal, a measurement for at least one wall defining the floor plan;

executing the floor plan algorithm to calculate any remaining wall dimensions associated with the floor plan based on the received measurement and a stored floor plan dataset, and displaying the calculated wall dimensions on the computer terminal;

receiving, at the computer terminal, an input to adjust the wall dimensions;

displaying, at the computer terminal, a plurality of additional elements as floor plan limitations addable to the floor plan by dragging and dropping;

executing the design proposal algorithm, the design proposal algorithm configured to i) analyze a database of design element blocks, each block comprising a plurality of related design elements pre-configured as a single placement unit with shared limiting characteristics applying to the block as a whole, such limiting characteristics defined by defined by its a) dimensions defining the block's footprint, b) clearance requirements comprising at least a minimum clearance value for the block as a whole, c) anchor points defining required positional relationships between the block and architectural features of the floor plan, each anchor point comprising a directional designation indicating a required orientation of the block relative to the architectural feature, and d) configuration restrictions, and to ii) identify at least one block of related design elements that is functionally and dimensionally appropriate for the calculated floor plan, including its clearance requirements and anchor points, based on any of one or more user preferences and floor plan limitations;

displaying at the computer terminal, at least one identified block as a design proposal;

receiving, at the computer terminal, a selection of a design proposal;

populating the floorplan, at the computer terminal, with the selected design proposal in accordance with the one or more user preferences and floor plan limitations; and receiving, at the computer terminal, an input to receive alternative design proposal selections and adjust any selected design proposal by dragging and dropping.

14. The method of claim 13, wherein receiving the floor plan comprises presenting, at the computer terminal, a display screen with a window for a sketch of a room shape and recording a sketch of the room shape input via a touchscreen device associated with the computer terminal.

15. The computer-implemented method of claim 13, wherein receiving the floor plan comprises receiving, at the computer terminal, a digital blueprint of the floor plan defining the selected room type.

16. The method of claim 13, further comprising, storing the wall adjustment inputs as a floor plan dataset and refining the floor plan algorithm to one that minimizes wall adjustment inputs over the floor plan dataset.

17. The method of claim 13, further comprising receiving block adjustment inputs at the touchscreen devices of the plurality of user computer terminals to adjust the design proposal.

18. The method of claim 17, further comprising storing the block adjustment inputs as a design dataset on the computer memory device and refining the design proposal algorithm to one that minimizes block adjustment inputs over the design dataset.

19. The computer-implemented method of claim 1, wherein the floor plan is defined by one or more zones, each zone designating a specific purpose or activity within the floor plan, and wherein the design proposal algorithm identifies at least one block suited to each zone based on the one or more user preferences and floor plan limitations.

\* \* \* \* \*